United States Patent [19]

Hansen

[11] Patent Number: 5,788,205

[45] Date of Patent: Aug. 4, 1998

[54] REARVIEW MIRROR MOUNT

[75] Inventor: Scott A. Hansen, Holland, Mich.

[73] Assignee: Prince Corporation, Holland, Mich.

[21] Appl. No.: 624,883

[22] Filed: Mar. 27, 1996

[51] Int. Cl.$^6$ .................................................. A47F 9/14
[52] U.S. Cl. ............................. 248/475.1; 248/468
[58] Field of Search ........................ 248/475.1, 468, 248/477, 478, 481, 483, 488, 482

[56] References Cited

U.S. PATENT DOCUMENTS

| | | |
|---|---|---|
| 2,940,361 | 6/1960 | Francisco . |
| 3,236,152 | 2/1966 | Alford . |
| 3,425,657 | 2/1969 | Doyle . |
| 3,471,115 | 10/1969 | Corbin . |
| 3,515,365 | 6/1970 | Jones et al. . |
| 3,575,375 | 4/1971 | Strem, Jr. . |
| 3,589,662 | 6/1971 | Lagrange . |
| 3,596,867 | 8/1971 | Allander . |
| 3,703,270 | 11/1972 | Tomlin . |
| 4,012,022 | 3/1977 | Tomita . |
| 4,066,235 | 1/1978 | Hashiguchi . |
| 4,436,273 | 3/1984 | Yuda et al. . |
| 4,848,888 | 7/1989 | Polzer . |
| 4,899,975 | 2/1990 | Suman . |
| 4,909,470 | 3/1990 | Clark . |
| 4,916,595 | 4/1990 | Naruke et al. . |
| 4,948,085 | 8/1990 | Mittelhäuser . |
| 4,995,581 | 2/1991 | Koiwai et al. . |
| 5,439,305 | 8/1995 | Santo . |
| 5,487,522 | 1/1996 | Hook ........................ 248/483 |

FOREIGN PATENT DOCUMENTS

| | | |
|---|---|---|
| 164243 | 9/1984 | Japan . |
| 1123290 | 8/1968 | United Kingdom . |
| 1214578 | 12/1970 | United Kingdom . |

Primary Examiner—Leslie A. Braun
Assistant Examiner—Willie Berry, Jr.
Attorney, Agent, or Firm—Price, Heneveld, Cooper, DeWitt & Litton

[57] ABSTRACT

A mirror mount includes a mounting arm having a first end adjustably receiving a rearview mirror housing and an opposite end having an upper surface facing the vehicle roof when installed. The upper surface includes a plurality of upwardly extending projections generally aligned at the apices of a triangle for cooperating with spaced apertures in the sheet metal roof of a vehicle for locating a mounting arm to a vehicle roof. A bias spring and a fastener attach the mounting arm to the vehicle roof. In one embodiment of the invention, the opposite end of the mounting arm includes an opening having opposed facing edges and the bias spring comprises a spring plate having edges which snap-fit within the opposed edges of said mounting arm and provide a bias force between the upper surface of the opposite end of the mounting arm in the vehicle roof such that the projections are coupled to the roof under a compressive force which substantially prevents vibration and accurately aligns and holds the mounting arm to the vehicle roof. In another embodiment of the invention, the bias spring is a coil spring interposed between a lower surface of the opposite end of the mounting arm and receives a threaded fastener which extends into a snap-in clip for securing the assembly to the vehicle roof.

25 Claims, 3 Drawing Sheets 5,788,205

1

REARVIEW MIRROR MOUNT

BACKGROUND OF THE INVENTION

The present invention relates to a mounting system for attaching a rearview mirror to the roof of a vehicle.

Rearview mirrors are typically mounted directly to the windshield of a vehicle utilizing an adhesive material for attaching a mounting base to the windshield. A mounting arm is attached to the base and adjustably supports a rearview mirror housing having a rearview mirror mounted therein. In some installations, the rearview mirror is mounted directly to the roof with fastening screws to provide a solid anchoring of the rearview mirror to the underlying sheet metal structure of the roof.

For safety purposes, breakaway rearview mirrors are desirable such that, in the event of an accident, the rearview mirror assembly will not provide a solid obstacle in the event of an impact with a person's head. U.S. Pat. No. 4,909,470 discloses a breakaway rearview mirror assembly which attaches to a roof console and which provides a snap-in rearview mirror mount. Although the console and insertable rearview mirror assembly so disclosed provides the desired breakaway safety option as well as a solid mirror attachment to the vehicle, the structure disclosed is somewhat complicated and to some extent thereby increasing the cost of such a system unless incorporated into an overhead console.

Other rearview mirror mounting structures utilizing snap-in clips have been proposed, however, the mounting of a rearview mirror directly to the roof of a vehicle utilizing a breakaway snap-in clip typically leads to vibration problems. When the vehicle is in operation, bumps in the road during normal vehicle operation tends to vibrate the mirror making its use somewhat difficult. As a result, there remains a need for a roof-mounted rearview mirror structure which provides the desired safety breakaway mounting structure and yet eliminates the vibration problem typically encountered when a rearview mirror is snap-fitted within a roof to provide a breakaway mount.

SUMMARY OF THE PRESENT INVENTION

The rearview mirror mounting system of the present invention overcomes the difficulty of prior rearview mirror mounting structure by providing a mounting structure in which a mounting arm to which a rearview mirror housing is attached includes a base with upwardly extending spaced projections. The projections align the rearview mirror housing with the associated sheet metal roof mounting structure and provide contact points with the roof which substantially eliminate vibration and allows for breakaway mounting of the rearview mirror to the vehicle roof. In one embodiment of the invention, the base includes a plurality of upwardly extending projections generally aligned at the apices of a triangle for cooperating with spaced apertures in the sheet metal roof of a vehicle for locating a mounting arm to a vehicle roof. Bias means couple the base to a fastener for attaching the mounting arm to the vehicle roof. In a preferred embodiment of the invention, the base of the mounting arm includes an opening having opposed facing edges, and the bias spring comprises a spring plate having edges which snap-fit within the opposed edges of said base and provide a bias force between the upper surface of the base and the vehicle roof such that the projections are coupled to the roof under a compressive force which substantially prevents vibration and accurately aligns and holds the mounting arm to the vehicle roof.

In another embodiment of the invention, the bias means comprises a coil spring interposed between a lower surface of the base and receives a threaded fastener therethrough which extends into a snap-in clip for securing the assembly to the vehicle roof. Such mounting systems, therefore, provide a snap-in breakaway mirror mount assembly which provides a multiple-point alignment and inter-engagement with the vehicle roof and a central mounting aperture for anchoring the mirror mount to the vehicle roof. The structure requires a minimum number of parts and provides an improved mirror mount which provides the desired safety and vibration-free mounting.

These and other features, objects and advantages of the present invention will become apparent upon reading the following description thereof together with reference to the accompany drawings.

DETAILED DESCRIPTION OF THE PREFERRED EMBODIMENT

Figure 1:
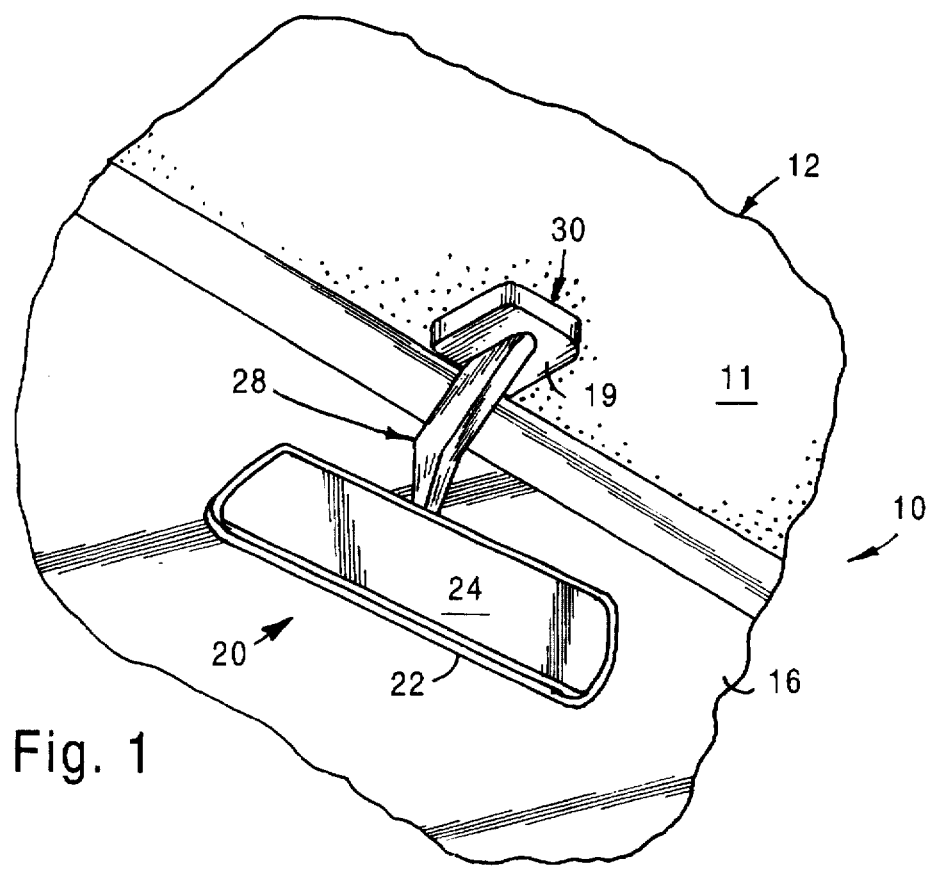
FIG. 1 is a fragmentary perspective view of a vehicle embodying a rearview mirror assembly of the present invention.

Referring initially to FIG. 1, there is shown a vehicle 10, such as an automobile, having a roof 12 including a sheet metal support member 14 (FIGS. 2-4) extending along the top of the roof adjacent the windshield 16. The roof is covered by an upholstered, integrally molded headliner 11 to provide a decorative interior to the vehicle. Mounted to the sheet metal roof support 14 is a rearview assembly 20 embodying the present invention and including a rearview mirror housing 22 having a rearview mirror 24 mounted therein. The rear of housing 22 includes a conventional ball-and-socket mounting structure which allows the rearview mirror 24 to be adjusted to any desired operative position for convenience. The mirror assembly 20 further includes a mounting arm 28 having, as seen in the embodiment of FIG. 5, a ball 26 forming a portion of the ball joint mounting assembly and a base 30 at an opposite end of arm 28 from the ball 26 for mounting the arm to the underlying sheet metal roof support. As seen in FIG. 1, a decorative cover 19 may fit over arm 28 to cover the base 30.

Figure 3:
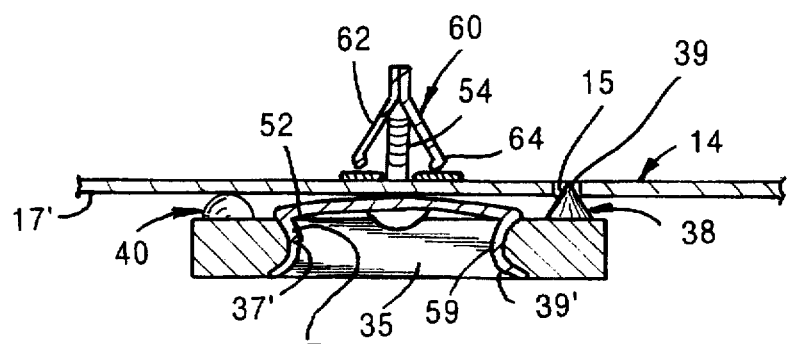
FIG. 3 is a cross-sectional view taken along section line III—III in FIG. 2, subsequent to the assembly and installation of the rearview mirror in the vehicle.
Figure 4:
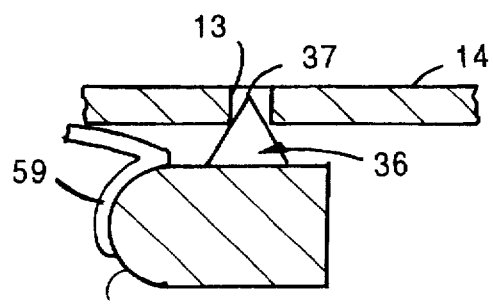
FIG. 4 is a greatly enlarged fragmentary cross-sectional view of one of the mounting projections shown in FIG. 2.
Figure 2:
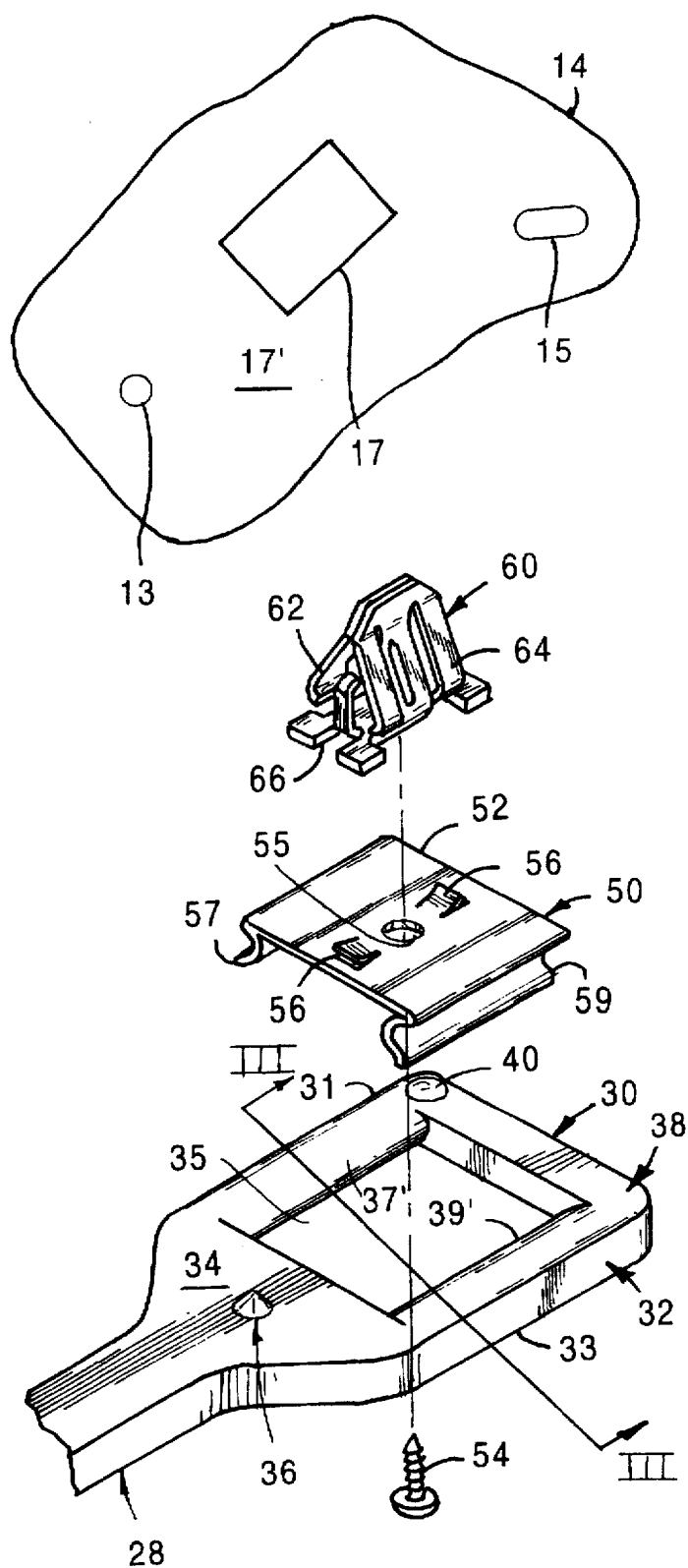
FIG. 2 is an exploded fragmentary perspective view of a first embodiment of the present invention.
Figure 5:
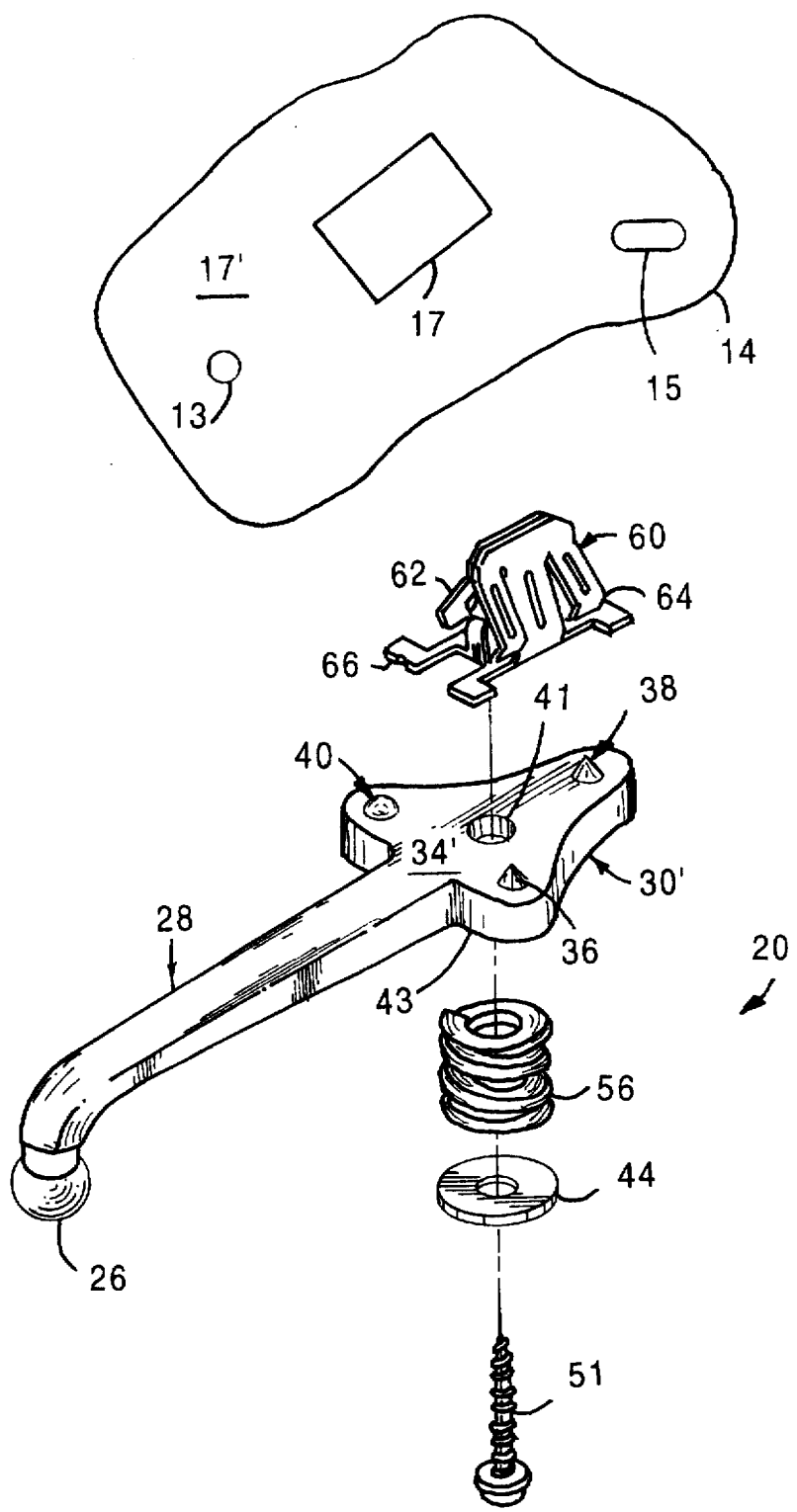
FIG. 5 is a fragmentary perspective exploded view of an alternative embodiment of the present invention.

Base 30, in the embodiment shown in FIGS. 1-4, comprises a generally rectangular frame 32 integrally formed with arm 28 at its opposite end from the ball mount (not shown) and mirror housing 22. Frame 32 has a thickness of from about ¼ to ⅜ inches and is integrally molded of die cast magnesium to provide both a relative light-weight mounting structure as well as one with sufficient strength to support the mirror housing 22 and mirror 24 therein. The base 30 includes an upper surface 34 having three upwardly extending projections 36, 38, 40 arranged in a generally triangular pattern with projections 36 and 38 being conical and terminating in a tip 37 and 39, respectively (FIGS. 4 and 3, respectively). Projection 40, on the other hand, is hemispherical in configuration, as best seen in FIGS. 2 and 3.

Projection 36 is positioned on base 30 to be aligned with a corresponding circular aperture 13 (FIGS. 2 and 4) formed in sheet metal support member 14. Triangular projection 38 is aligned to fit within an elongated slot 15 in roof member 14 which extends radially outwardly from the center of a rectangular mounting aperture 17 formed in the sheet metal roof structure 14 which, in turn, receives a snap-in mounting clip 60 (FIGS. 2 and 3) for holding the mirror assembly to the vehicle roof. Interposed between the base 30 and the snap-in mounting clip 60 is a bias spring 50 comprising, in the embodiment shown in FIGS. 2–4, a flat spring plate having a central, generally rectangular body 52 generally conforming to the shape of the rectangular opening 35 in base 30 of arm 28. The sides 31 and 33 of the rectangular frame 32 include inwardly facing opposed surfaces 37' and 39', respectively, which are semicylindrical, as best seen in FIGS. 3 and 4, and spaced to matingly receive downwardly extending semicylindrical edges or legs 57 and 59 of spring plate 50 to compressively bow the body 52 of spring plate 50 as illustrated in FIG. 3. The body 52 is thus electrically deflected to provide a compressive mounting force between triangular projections 36, 38 fitted within corresponding apertures 13 and 15 and the rounded projection 40 riding on the lower surface 17' of sheet metal support 14.

Spring plate 50 includes a central aperture 55 through which a fastening member, such as a threaded fastening screw 54, extends and is received by a threaded opening in a conventional snap-in fastener 60. Fastener 60 includes a pair of spring-biased arms 62, 64 on opposite sides which engage the upper surface of sheet metal member 14, as seen in FIG. 3. Its body includes a pair of slots 66 (one shown) which receive upwardly formed tabs 56 of spring plate 50 to interlock fastener 60 and spring plate 50.

As seen in FIGS. 3 and 4, the arcuate arms 57, 59 of spring plate 50 can have an arcuate length which varies, as illustrated in FIG. 4, such that the breakaway force provided between base 30 and plate 50, which is securely anchored to the vehicle roof by fastener 60, can be varied. In the preferred embodiment, the arc circumscribed by the curved arms 57, 59 is from 100° to 200°, with a range of 110° to 180° being preferred. In the embodiment shown in FIG. 3, an arc of substantially 160° is provided, while in the embodiment shown in FIG. 4, an arc of approximately 100° is provided. With the shorter arc shown in FIG. 4, the breakaway force is lessened. Thus, by adjusting the arcuate length of legs 57, 59, the breakaway force can be selected as desired. Also, as can be appreciated, the spacing between the legs 57, 59, as well as the thickness of the spring plate, which in the preferred embodiment was approximately 0.030 inches thick, can also be selected to vary the breakaway force. In any event, the breakaway force is selected to meet the FMVSS Safety Standard 201 for a 90 pound impact force.

The structure shown in FIGS. 1–4 is assembled by first coupling clip 60 to spring plate 50 utilizing fastening screw 54. Subsequently, this subassembly is pushed into the rectangular opening 35 and snap-locked therein which also deforms the otherwise flat body 52 of spring plate 50 into a convexly crowned (as viewed from the top) spring, as shown in FIG. 3. Next, the assembly is mounted to the vehicle by first aligning triangular projection 36 with aperture 13 and rotating the assembly until clip 60 aligns with aperture 17 whereupon the structure is pushed upwardly while triangular projection 38 aligns with slot 15. Slot 15 is elongated to provide some tolerance variation between the triangular projection 36 and its aperture 13 and triangular projection 38 and its associated aperture 15. As can be appreciated, the headliner 11 will have a cutout to expose the mounting surface 17' of roof support 14.

When installed, the hemispherical projection 40 rides on the lower surface 17' to complete the three-point support. The top of body 52 typically will not contact surface 17' of sheet metal support 14. The diameter of aperture 13 and the width of aperture 15 is selected to allow the conical projections to extend partially therein, as seen in FIGS. 3 and 4, to provide a substantially even mount with the upper surface 34 of base 30 substantially parallel with and spaced slightly below surface 17' of roof mounting structure 14. The spacing between upper surface 34 of base 30 and lower surface 17' of the roof structure is controlled by the dimensions of conical projections 36 and 38 as well as hemispherical projection 40 such that when in the installed position illustrated in FIGS. 1 and 3, a compressive force is applied by the projections against the roof support structure 14, thereby securely anchoring the base 30 to the roof and preventing vibration of the mirror attached to the mounting arm 28. Thus, when the body of spring 50 is secured to clip 60 and clip 60 inserted into aperture 17, projections 36, 38 and 40 provide equilaterally spaced compressive forces anchoring the mounting base to the vehicle roof.

In the embodiment shown in FIG. 5, substantially identical parts are identified with the same reference numeral as that in the first embodiment shown in FIGS. 2–4. In FIG. 5, the roof support 14 is the same as that shown in FIG. 2 and includes a central, generally rectangular aperture 17 for receiving a snap-in clip 60 of the same construction as that shown in FIG. 2. A circular aperture 13 in support 14 receives a conical projection 36 extending upwardly from the upper surface 34' of the generally triangular base 30'. Support 14 also includes an elongated aperture 15 which is aligned with triangular projection 38 on the upper surface of base 30'. Finally, the upper surface 34' of base 30' includes a hemispherical projection 40 with the projections 36, 38 and 40 cooperating with apertures 13 and 15 and the lower surface 17' of support member 14 as in the first embodiment. In the embodiment shown in FIG. 5, however, the base 30' has a generally triangular configuration with projections 36, 38 and 40 positioned at the apices of the triangular plate. Base 30' includes a central, generally cylindrical aperture 41 extending therethrough for receiving a threaded fastener 51. A compressive coil spring 56 extends between the lower surface 43 of base 30' with a flat washer 44 extending between the head of fastener 51 and coil spring 56.

The mirror assembly 20 of FIG. 5 is preassembled prior to installation in the vehicle by threading fastener 54 through washer 44, compressive coil spring 56, aperture 41 and into central aperture in snap-in fastener 60. The subassembly is subsequently installed in the vehicle by centering projection 36 within aperture 13 and pushing mounting clip 60 into an installed position within aperture 17 in the sheet metal support 14 with projection 38 fitting within slot 15.

In the embodiment shown in FIG. 5, the compression spring 56, when fastener 51 is threaded into clip 60 and clip 60 inserted into aperture 17, provides a compressive force urging the projections 36, 38 and 40 into contact with the lower surface 17' of roof support 14 in the same manner as the embodiment shown in FIGS. 3 and 4 for holding the base 30' and the rearview mirror attached thereto to the vehicle in a stable, vibration-free manner. To provide the desired breakaway force, the diameter and threading of fastener 51 is selected to strip away from mounting clip 60 upon impact force of the predetermined amount according to the safety standard referred to above. Alternatively, the fastener 51 could include a breakaway section of reduced diameter selected to provide the same desired breakaway force. In either of the embodiments described in this application, the rearview mirror can be removed for servicing by removing fastener 54 in the FIGS. 2–4 embodiment or 51 in the FIG. 5 embodiment with the mounting clip 60 remaining in the vehicle roof. The rearview mirror can, thus, be serviced as necessary and subsequently reinstalled by inserting the threaded fastener into clip 60. In both embodiments, a decorative cover 19 (FIG. 1) is placed over the base 30 or 30' to provide a trim appearance to the installation.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A mirror mount for attaching a rearview mirror to a vehicle roof comprising:

a mounting arm having a first end for adjustably receiving a rearview mirror housing thereon, said mounting arm including an opposite end including an upper surface facing the vehicle roof when installed in a vehicle, said upper surface having a plurality of upwardly extending spaced projections generally defining the apices of a triangle for cooperating with spaced apertures in the roof of a vehicle for securing said mounting arm to the vehicle roof; and bias means coupled to said opposite end of said mounting arm and a fastener extending through said bias means and said mounting arm for attaching said mounting arm to a vehicle roof, wherein said bias means comprises a coil spring and said fastener includes a threaded fastener extending through said coil spring.

2. The mirror mount as defined in claim 1 and further including a snap-in clip for receiving said threaded fastener, and wherein said clip is adapted to snap into an aperture in the vehicle roof.

3. The mirror mount as defined in claim 2 wherein said upwardly extending projections include a pair of generally conical projections which extend partially into apertures within the vehicle roof and a rounded projection which rests against the vehicle roof.

4. The mirror mount as defined in claim 3 wherein said rounded projection is hemispherical.

5. A mirror mount for attaching a rearview mirror to a vehicle roof comprising:

a mounting arm having a first end for adjustably receiving a rearview mirror housing thereon, said mounting arm including an opposite end having a mounting surface for securing said mounting arm to the vehicle roof including an upper surface facing the vehicle roof when installed in a vehicle, said upper surface having a plurality of upwardly extending spaced projections generally defining the apices of a triangle for cooperating with spaced apertures in the roof of a vehicle for assisting in securing said mounting arm to the vehicle roof; and bias means coupled to said mounting surface of said mounting arm and a fastener extending through said bias means and said mounting arm for attaching said mounting arm to a vehicle roof, wherein said opposite end of said mounting arm includes an aperture and wherein said mounting surface is defined by opposed curved facing sidewalls of said aperture and wherein said bias means comprises a spring plate having opposite edges which are curved to mateably engage said facing sidewalls to snap-fit said spring plate within said aperture of said opposite end of said mounting arm.

6. The mirror mount as defined in claim 5 wherein the arcuate length of said opposite edges of said spring plate is selected to provide a predetermined breakaway force for said mount.

7. A mirror mount for attaching a rearview mirror to a vehicle roof comprising:

a mounting arm having a first end for adjustably receiving a rearview mirror housing thereon, said mounting arm including an opposite end including an upper surface facing the vehicle roof when installed in a vehicle, said upper surface having a plurality of upwardly extending spaced projections generally defining the apices of a triangle for cooperating with spaced apertures in the roof of a vehicle for securing said mounting arm to the vehicle roof; and bias means coupled to said opposite end of said mounting arm and a fastener extending through said bias means and said mounting arm for attaching said mounting arm to a vehicle roof, wherein said opposite end of said mounting arm includes an aperture having opposed curved facing sidewalls and wherein said bias means comprises a spring plate having opposite edges which are curved to mateably engage said facing sidewalls to snap-fit said spring plate within said aperture of said opposite end of said mounting arm, and wherein said spring plate includes a central aperture and said fastener includes a threaded fastener extending through said central aperture of said spring plate.

8. The mirror mount as defined in claim 7 and further including a snap-in clip for receiving said threaded fastener, and wherein said clip is adapted to snap into an aperture in the vehicle roof.

9. The mirror mount as defined in claim 8 wherein said upwardly extending projections include a pair of generally conical projections which extend into apertures within the vehicle roof and a rounded projection which rests against the vehicle roof.

10. A mirror mount for attaching a rearview mirror to the surface of a vehicle roof support comprising:

a mounting arm for receiving a rearview mirror, said mounting arm including a base defining sidewalls for mounting said base to the vehicle roof, said base further including a surface facing the vehicle roof when installed in a vehicle, said surface including a plurality of upwardly extending spaced projections cooperating with spaced apertures in the roof of a vehicle;

bias means coupled to said sidewalls of said base of said mounting arm; and a fastener coupled to said bias means and said sidewalls for attaching said mounting arm to a vehicle roof, wherein said sidewalls of said base are defined by an aperture having opposed facing sidewalls and wherein said bias means comprises a spring plate having opposite edges which mateably engage said facing sidewalls to snap-fit said spring plate within said aperture of said base.

11. The mirror mount as defined in claim 10 wherein said facing sidewalls have a curved surface and said opposite edges are curved.

12. The mirror mount as defined in claim 11 wherein the arcuate length of said opposite edges of said spring plate is selected to provide a predetermined breakaway force for said mount.

13. The mirror mount as defined in claim 10 wherein said spring plate includes a central aperture and said fastener includes a threaded fastener extending through said central aperture of said spring plate.

14. The mirror mount as defined in claim 13 wherein said fastener further includes a snap-in clip for receiving said threaded fastener, and wherein said clip is adapted to snap into an aperture in the vehicle roof.

15. A mirror mount for attaching a rearview mirror to the surface of a vehicle roof support comprising:

a mounting arm for receiving a rearview mirror, said mounting arm including a base with a surface facing the vehicle roof when installed in a vehicle, said surface including a plurality of upwardly extending spaced projections cooperating with spaced apertures in the roof of a vehicle, wherein said upwardly extending projections include a pair of generally conical projections which extend into apertures within the vehicle roof and a rounded projection which rests against the surface of the vehicle roof support;

bias means coupled to said base of said mounting arm; and a fastener coupled to said bias means and said base for attaching said mounting arm to a vehicle roof.

16. The mirror mount as defined in claim 15 wherein said projections generally are located in a triangular patter.

17. The mirror mount as defined in claim 16 wherein said rounded projection is hemispherical.

18. A mirror mount for attaching a rearview mirror to the surface of a vehicle roof support comprising:

a mounting arm for receiving a rearview mirror, said mounting arm including a base defining sidewalls for mounting said base to the vehicle roof, said base further including a surface facing the vehicle roof when installed in a vehicle, said surface including a plurality of upwardly extending spaced projections cooperating with spaced apertures in the roof of a vehicle;

bias means coupled to said sidewalls of said base of said mounting arm; and a fastener coupled to said bias means and said sidewalls for attaching said mounting arm to a vehicle roof, wherein said bias means comprises a coil spring and said fastener includes a threaded fastener extending through said coil spring.

19. The mirror mount as defined in claim 18 and further including a snap-in clip for receiving said threaded fastener, and wherein said clip is adapted to snap into an aperture in the vehicle roof.

20. The mirror mount as defined in claim 19 wherein said upwardly extending projections are arranged in a triangular pattern and include a pair of generally conical projections which extend partially into apertures within the vehicle roof and a rounded projection which rests against the vehicle roof.

21. A mirror mount for attaching a rearview mirror to a vehicle roof comprising:

a mounting arm having a first end for adjustably receiving a rearview mirror housing thereon, and an opposite end with a base for attachment to the vehicle roof, said base including a surface facing the roof and having a plurality of upwardly extending projections generally aligned in a triangular pattern for cooperating with spaced apertures in the roof of a vehicle and mounting surfaces independent of said projections for locating said base in locking engagement with the vehicle roof; and a bias spring and fasteners for engaging said mounting surfaces for coupling said base in compressive engagement to the vehicle roof, wherein said mounting surfaces are defined by an aperture in said base having opposed curved facing sidewalls and wherein said bias spring comprises a spring plate having curved outwardly extending edges which snap-fit within said curved facing sidewalls of said base.

22. The mirror mount as defined in claim 21 wherein the arcuate length of said opposite edges of said spring plate is selected to provide a predetermined breakaway force for said mount.

23. A mirror mount for attaching a rearview mirror to a vehicle roof comprising:

a mounting arm having a first end for adjustably receiving a rearview mirror housing thereon, and an opposite end with a base for attachment to the vehicle roof, said base including a surface facing the roof and having a plurality of upwardly extending projections generally aligned in a triangular pattern for cooperating with spaced apertures in the roof of a vehicle for locating said base in locking engagement with the vehicle roof;

a bias spring and fasteners for coupling said base in compressive engagement to the vehicle roof, wherein said base of said mounting arm includes an aperture having opposed curved facing sidewalls and wherein said bias spring comprises a spring plate having curved outwardly extending edges which snap-fit within said curved sides of said base, and wherein the arcuate length of said opposite edges of said spring plate is selected to provide a predetermined breakaway force for said mount; and said fastener further includes a snap-in clip for receiving a threaded fastener, said clip adapted to snap into an aperture in the vehicle roof.

24. A mirror mount for attaching a rearview mirror to a vehicle roof comprising:

a mounting arm having a first end for adjustably receiving a rearview mirror housing thereon, and an opposite end with a base for attachment to the vehicle roof, said base including a surface facing the roof and having a plurality of upwardly extending projections generally aligned in a triangular pattern for cooperating with spaced apertures in the roof of a vehicle and mounting surfaces independent of said projections for locating said base in locking engagement with the vehicle roof; and a bias spring and fasteners for engaging said mounting surfaces for coupling said base in compressive engagement to the vehicle roof, wherein said bias spring comprises a coil spring and said fastener includes a threaded fastener extending through the center of said coil spring.

25. The mirror mount as defined in claim 24 wherein said fastener further includes a snap-in clip for receiving said threaded fastener, said clip adapted to snap into an aperture in the vehicle roof.

* * * * *